Dec. 31, 1968     G. V. ELMORE ET AL     3,419,900
FUEL CELLS WITH ALKALI METAL HYDROXIDE ELECTROLYTE AND
ELECTRODE CONTAINING FLUOROCARBON POLYMER
Filed Dec. 22, 1966

SILVER POWDER TREATED WITH POLYTETRAFLUOROETHYLENE

INVENTORS,
GLENN V. ELMORE
HOWARD A. TANNER

United States Patent Office 3,419,900
Patented Dec. 31, 1968

3,419,900
FUEL CELLS WITH ALKALI METAL HYDROXIDE ELECTROLYTE AND ELECTRODE CONTAINING FLUOROCARBON POLYMER
Glenn V. Elmore, Vestal, N.Y., and Howard A. Tanner, Xenia, Ohio, assignors to Leesona Corporation, Warwick, R.I., a Corporation of Massachusetts
Continuation-in-part of application Ser. No. 12,758, Mar. 4, 1960. This application Dec. 22, 1966, Ser. No. 609,985
16 Claims. (Cl. 136—86)

ABSTRACT OF THE DISCLOSURE

Lightweight electrodes and an electrochemical cell utilizing the said electrodes are described. The lightweight electrodes comprise a catalytic layer containing a substantially uniform admixture of metal-containing electrocatalyst particles and a fluorocarbon polymer. When the electrode is disposed of in the electrochemical cell, the catalytic layer is exposed to the electrolyte of the cell. There is further described electrolytes comprising an eutectic mixture of at least two alkali metal hydroxides substantially free of water and electrolytes having a paste-like consistency at a temperature below about 300° C.

---

This application is a continuation-in-part of Ser. No. 12,758 filed Mar. 4, 1960, now abandoned; and Ser. No. 332,812 filed Dec. 23, 1963, now abandoned.

This invention relates to electrochemical cells, exemplified hereinafter by fuel cells. More particularly the invention relates to improved cell constructions, constituents and components thereof.

Theoretically, a fuel cell of the type used to illustrate this invention operates to convert the energy of a chemical reaction between a fuel and an oxidizer directly into electrical energy without any physical or chemical change in the constituents and/or components of the cell, namely, the electrolyte and electrodes. In the ideal cell, the composition of the electrolyte remains stable and essentially unchanged, and the electrodes undergo no change or deterioration during operation of the cell, or merely as a result of aging over a period of time.

In practice, however, especially in cells employing an essentially hydrogen-oxygen reaction and an aqueous electrolyte, the formation of water as a by-product causes a dilution of the electrolyte solution with subsequent reduction of current output. Furthermore, the current density obtained during operation of the cell is dependent to some extent upon the surface area of the electrodes which are in contact with the electrolyte and the fuel or oxidizer gas. The clogging of the electrode surface by the water produced, particularly where a porous electrode is used, eventually results in such a decrease in the useful area of the electrode as to lower appreciably the current density of the cell.

Hitherto, it has been necessary to eliminate the excess or product water from aqueous electrolyte fuel cells by passing an excess of gas over the electrode surface to evaporate the water and carry it away as vapor. This is, of course, a wasteful procedure. A second alternative has been to employ non-aqueous fused salt electrolytes at very high temperatures. These have been unsatisfactory because of the rapid deterioration of electrode materials and other cell components at such temperatures. Another alternative has been to operate an aqueous electrolyte cell under pressure at an elevated temperature. The electrolyte is circulated and separately processed to remove excess water. This alternative makes the cell and its necessary appurtenances too complex for some applications.

Another alternative is to use a damp cationic ion exchange membrane as the electrolyte. This membrane provides mobile hydrogen ions whereas the anionic component is an integral part of the membrane structure. As a result, water forms only at the oxidizing electrode and must be removed. The cationic membrane inherently has more electrical resistance than an aqueous electrolyte, which means lower electrical power output, and the resistance is a function of humidity and becomes very high if the membrane becomes dry.

This invention provides a new type of fuel cell which can be operated at a higher temperature than has hitherto been possible for an aqueous electrolyte fuel cell at atmospheric pressure. The use of the higher temperature permits the product water to escape as vapor so that it does not dilute the electrolyte or clog up the electrode pores. Certain material combinations have been discovered which can operate in this manner for long periods of time without deterioration. These results are achieved by the proper selection of electrolyte composition and electrode composition and construction. These cells overcome the inherent disadvantages present in the various alternative types of fuel cells described above. Obviously, however, as will be more fully apparent hereinafter, cells employing one or more of the novel features of the invention can be advantageously operated at low temperatures, i.e., below 100° C.

Accordingly, a primary object of this invention is to provide an improved fuel cell construction which is capable of operation under atmospheric pressures (approximately 15 p.s.i.) and at temperatures of 100° C. or higher, such that any water formed during cell operation may be vaporized and, thus, readily removed.

Another object of the invention is to provide such a cell together with an electrolyte which is essentially stable within the range of temperatures at which the cell normally operates.

Another object of this invention is to provide such a cell together with an electrolyte which is essentially stable within the range of temperatures at which the cell normally operates and which has a paste-like consistency.

Another object of the invention is to provide such a cell together with an electrolyte which is essentially stable within the range of temperatures at which the cell normally operates which is an eutectic mixture of at least two alkali hydroxides.

It is another object of the invention to provide a fuel cell comprising an aqueous phosphoric acid electrolyte which has a pastel-like consistency.

A further object of the invention is to provide an improved electrode construction for fuel cells in which a porous electrode, such as a porous carbon block, is treated with a water repellent substance which does not impede the diffusion of gas through the electrode during cell operation.

A further object of the invention is to provide an improved electrode construction for an electrochemical cell utilizing an aqueous electrolyte comprising an electrocatalytic powder in intimate admixture with a water and electrolyte repellent material.

A further object of the invention is to provide an improved electrode construction for an electrochemical cell comprising an electricatalytic powder in intimate admixture with a hydrophobic fluorocarbon material.

A further object of the invention is to provide an improved electrode construction for an electrochemical cell comrpising an electrocatalytic powder in intimate admixture with polytetrafluoroethylene.

A further object of the invention is to provide a fuel cell as outlined above wherein air may be used directly as the oxidizer, in combination with liquid for gaseous fuels which supply hydrogen ions for the chemical reaction within the cell.

It is another object of this invention to provide a composite fuel cell comprising an electrolyte contained in a suitable matrix with each major surface of said matrix being in contact with an electrode comprising an electrocatalytic material and a hydroprobic polymer.

Other objects and advantages of the invention will be apparent from the following description, the accompanying drawings and the appended claims.

Figure 1:
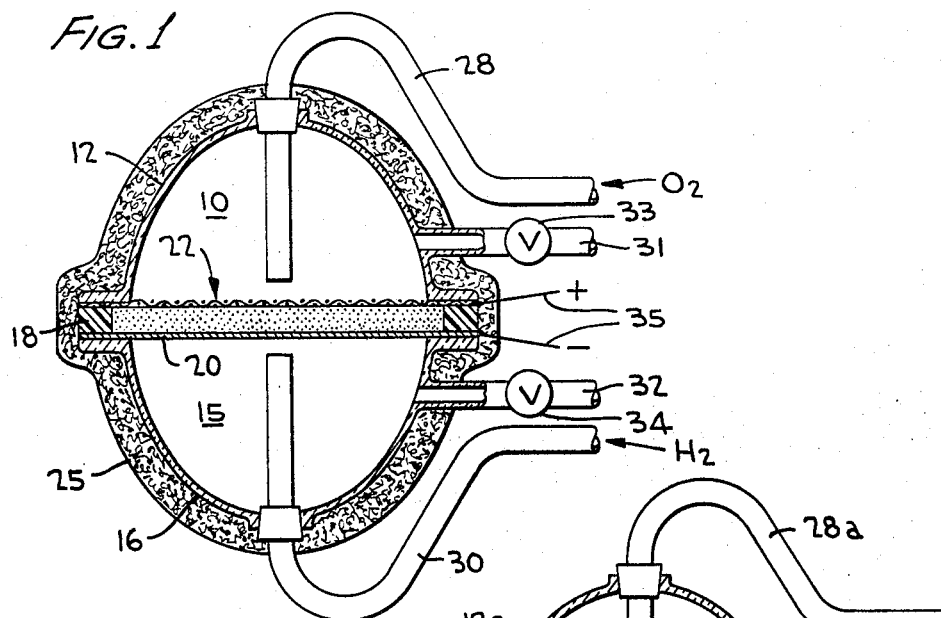
FIGURE 1 is a diagrammatic view of one form of fuel cell in accordance with the invention.

In fuel cells using essentially gaseous reactants, it is necessary to maintain good contact among a porous conducting electrode, an electrolyte solution which may be in a semi-liquid state, and a reactant gas which diffuses through the pores of the electrode. If the electrolyte gradually fills the pores of the electrode, or if products of the reaction fill the pores, as where water is a product, the gaseous reactant or fuel cannot enter the electrode, and the electrode becomes clogged or "water logged." The electrolyte may be prevented from clogging the electrode pores by a decrease in pore size and/or an increase in gas pressure. However, even under such conditions the passage of the electrical current through the cell tends to draw hydrated ions into the pores after a time. Also, water which may be formed as a result of the electrochemical reaction will tend to fill the pores and also to dilute the electrolyte.

Water repellent agents may be added to the porous electrode to prevent entry of liquid ino the pores, but such agents should have the desirable characteristics of permitting ready diffusion of the gaseous reactant through the pores. Water repellent, or highly hydrophobic materials, such as the fluoro carbons, as will be more apparent hereinafter, fulfill this requirement. Moreover, an electrolyte which has a paste-like consistency under the operating conditions of the cell, again as will be apparent hereinafter, can be advantageously employed. Further, as to the presence or collection of water, if the cell can be operated above the boiling point of water, then the water formed by the reaction would be removed as a gas, it would not collect in the electrode pores, and the electrolyte would not be diluted.

*Electrolytes*

One essential condition for the electrolyte of one preferred embodiment of this invention is good conductivity at temperatures in excess of 100° C., so that under atmospheric pressure much of the water which may form from the electrochemical reaction, oxidation of hydrogen, will be evaporated and thus easily removed. As a practical upper limit, 200° C., may be a suitable figure, since below this temperature it is relatively easy to select cell components which will not be damaged or decompose in operation.

Eutectic mixtures comprising alkaline hydroxides, such as eutectic mixtures of KOH and NaOH, may be formed having a melting point within the preferred range of 100 to 200° C., and the inclusion of some percentage of $Ca(OH)_2$ will produce further desirable properties in the electrolyte. For example, an eutectic mixture of 40 percent NaOH, 40 percent KOH, and 20 percent $Ca(OH)_2$ will form an electrolyte having a pasty consistency, since the $Ca(OH)_2$ forms a solid matrix. This reduces the tendency of the electrolyte to creep into the pores of the electrodes, evidently because of capillary attraction within the paste structure. It has been observed that water formed by the electrochemical reaction will keep the melting point of the mixture low enough for good conductivity at 120° C. and above. At a temperature much below this, the electrolyte takes up excess water and dilutes or gets too thin for practical purposes.

It should be understood that the present invention also contemplates the use of other alkali metal hydroxides alone or with alkaline earth hydroxides to form paste-like electrolytes which retain enough water at the operating temperature and humidity to be conductive and stable. For example, experiments conducted in connection with this invention show that essentially pure KOH will exhibit a substantial increase in conductivity at approximately 90° C., with the relative humidity prevailing in the operating hydrogen-oxygen fuel cell. Also, this increase in conductivity has been noted with mixtures of KOH with up to about ninety percent NaOH, twenty-five percent LiOH, or fifteen percent $Ca(OH)_2$. Pure KOH is more deliquescent than the mixtures, making the control of humidity more critical. The probable explanation of conductivity is that a KOH hydrate is formed which melts to form an ionic conducting system at a temperature at which the water of hydration is not lost. The effect of adding NaOH or a similar eutectic forming material is to reduce the melting temperature, and probably also to reduce the working range of the molten alkali hydrate. The use of NaOH also reduces the cost of the mixture as well as improving its performance. Calcium hydroxide in addition serves another important function when it is added in excess to form a solid phase. It converts the melt to a pasty mass which stays in place, and has less tendency to creep into electrode pores, or elsewhere, as previously noted.

With the eutectic mixtures, a balance between water loss from evaporation and water gain from the oxidation of hydrogen can readily be maintained in a cell in accordance with the invention, over a range of temperatures from around 100° C., or slightly above, upward. The low temperature limit is determined mainly by the particular electrolyte mixture used taking up excess water and getting too thin. High temperature limits are determined by the temperatures of decomposition of other components of the cell. Essentially, the electrolyte which is normally solid at room temperatures but fluid at the operating temperatures of the cell comprises an eutectic mixture of at least two alkali metal hydroxides having a melting point not greater than about 300° C. Such electrolytes will comprise the eutectic mixtures of potassium hydroxide, sodium hydroxide, lithium hydroxide, and rubidium hydroxide. Other components can be added to the electrolyte composite to enhance the ionic conductivity and/or lower the melting point, and the like.

Alkaline electrolytes do require a supply of essentially pure oxygen as the oxidizer, since carbon dioxide, in particular, from air will react to form carbonates which will contaminate these electrolytes and shorten the usual life of a cell. An acid electrolyte will avoid this particular drawback and permit the cell to operate with air, so long as such acid electrolyte remains essentially stable in the desired cell operating temperatures, and so long as cell components can be used which will not be attacked by the acid.

This invention further includes the discovery that phosphoric acid has desirable characteristics for this purpose. An electrolyte paste can be formed from $H_3PO_4$ mixed with a quantity of fine silica ($SiO_2$). One suitable mixture is of approximately 35 percent by weight of 86 percent $H_3PO_4$ and 65 percent by weight $SiO_2$. The proportions are not critical, however, so long as the paste is not so thin as to run out of the cell, or so thick that its ionic conductance is lowered. Good conductivity of this electrolyte is obtained at the lower temperatures and up to 200° C. or higher. A cell using this acid electrolyte can be maintained at its operating temperature by the waste heat of the electrochemical action in the cell. Such a cell may operate with a supply of hydrogen or of formic acid (HCOOH) as the fuel.

Electrodes

A suitable hydrogen electrode can be formed from palladium foil, for example of 0.0005″ thickness. At temperatures of about 150° C. and above, hydrogen will diffuse readily through this foil to the point of contact with the electrolyte. The palladium foil may show some deterioration after extended use of the cell, usually in the form of pin holes which develop after long use in an alkaline electrolyte cell operating at around 150° C.

For the oxygen electrode, or cathode, silver, platinum, or palladium powders placed in contact with oxygen or air make good electrodes for use with the molten eutectic (alkaline) electrolyte, but of themselves these powders become wetted by the molten electrolyte and their porosity is reduced to a considerable extent. To prevent such wetting, the metal powder is treated as follows.

As an illustrative example for use with the alkaline electrolyte, metallic silver powder is mixed with a colloidal dispersion of polytetrafluoroethylene (Du Pont Teflon 30), hereinafter called Teflon, and the mixture is pasted on a silver screen. The mixture is then dried at 120° C. and subsequently heated to around 300° C. to remove the dispersion agent, which is essentially a soap-like carrier. At this temperature, the Teflon is not heated to the point where the open porous structure of the Teflon-silver mixure might be destroyed.

In an acid electrolyte cell silver cannot be used; therefore, a similar electrode for acid cells can be constructed by pasting a platinum black-Teflon powder mix on a platinum screen, then drying and heating it similarly at substantially the same temperatures.

As another example of the invention, a non-wetting hydrogen electrode is constructed using a palladium black-Teflon powder pasted on a platinum screen, dried, then heated to about 300° C. Cells using such a hydrogen electrode have a somewhat higher current density than cells with the palladium foil electrode. However, the palladium foil generally has a longer life than the built-up type of hydrogen electrode in alkaline cells.

This invention also includes another type of porous electrode which has desirable characteristics particularly from a production standpoint, since it is economical of the precious metals (platinum, palladium, silver) which are preferred catalysts. At 150° C., carbon is not attacked by molten alkali, nor is it attacked by concentrated phosphoric acid.

Thus, electrodes formed of porous carbon blocks have been treated in accordance with the invention to provide a water repellent structure within the pores. The oxygen electrode is treated with a metallic silver powder, or the like, mixed with a colloidal Teflon dispersion. This mixture is pasted to the carbon block and heated to approximately 300° C., at which the soap-like carrier of the Teflon powder is driven off, and the blocks are then dried. The result is a Teflon dispersion impregnated into the pores of the carbon block, together with the silver powder, or the like, which acts as a catalyst on the oxygen electrode.

A hydrogen electrode is similarly prepared with the use of palladium black powder instead of the silver powder, and with the Teflon dispersion applied for the desired water and electrolyte repellent properties.

Essentially, the electrocatalyst which is to be employed in the presently described electrodes are the electrochemically active materials which will favorably influence an electrochemical reaction. Such materials are the pure elements, alloys, oxides, or mixtures thereof belonging to Groups I–B, II–B, IV, V, VI, VII and VIII of the Mendelyeev's Periodic Table. More specifically, the catalytic materials which may be used in making the instant structures are Group I–B.—silver, gold, copper;

Group II–B.—beryllium, magnesium, zinc, cadmium, mercury;
Group IV.—titanium, zirconium, tin, hafnium, lead;
Group V.—vanadium, phosphorous, arsenic, antimony, tantalum, bismuth;
Group VI.—sulfur, chromium, selenium, tellurium, tungsten, molybdenum;
Group VII.—manganese, rhenium;
Group VIII.—iron, cobalt, nickel, ruthenium, rhodium, palladium, osmium, iridium, platinum; and
Rare earth elements.—cerium, lanthanum, thorium, uranium, etc.

The hydrophobic material which is dispersed with the catalytic metal in making the electrode is preferably a hydrophobic polymer such as polytetrafluoroethylene, polytrifluorochloroethylene, polyvinylidenefluoride, polyvinylfluoride, polytrifluoroethylene, and co-polymers thereof. Because of its exceptional hydrophobicity, as well as its resistance to heat and to the corrosive environment of the electrolyte, polytetrafluoroethylene is preferred.

Figure 3:
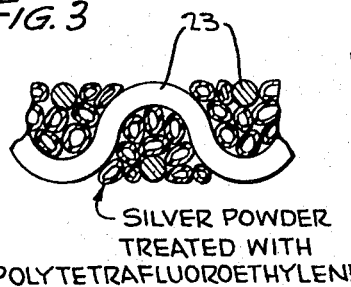
FIGURES 3–5 are detail views on an enlarged scale, showing novel electrode constructions for fuel cells.
Figure 4:
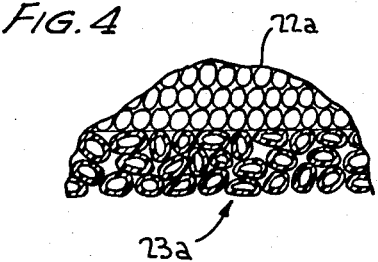
Figure 5:
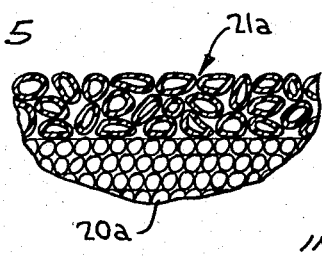

FIGURE 1 illustrates one embodiment of a fuel cell in accordance with the invention, including an oxygen supply chamber 10 formed by a hemisphere of glass or other suitable material 12 which will not be effected by the reactions of the cell. On the other side, the fuel chamber 15 is provided by a similar hemisphere 16, and the two are joined by suitable bolts or clamps (not shown) with a sealing gasket 18, preferably of Teflon, contained between the mating edges thereof. The fuel electrode 20 is provided by a piece of palladium foil. The oxygen electrode 22 is provided by a silver screen 23, the mesh of which is filled with silver powder which has been treated with Teflon powder in the manner previously set forth, and as shown particularly in FIGURE 3. The entire cell structure is covered with a suitable layer of insulation material 25, and oxidizer, in this form provided as essentially pure oxygen gas, is admitted through a supply line 28 into the chamber 10, while fuel, for example in the form of hydrogen gas, is supplied to the fuel tube or line 30 into chamber 15. Preferably, each of the fuel and oxidizer chambers is provided with a flushing conduit 31 and 32, respectively, including normally closed valves 33 and 34, which may be opened to release any collection of waste products in the cell chambers.

The electrolyte in this case is an eutectic mixture of KOH and NaOH, essentially as previously explained. During operation of the cell, of course, hydrogen and oxygen gas is supplied continuously through the fuel and oxidizer conduits 30 and 28, respectively, and as a result of the electrochemical reaction, direct current electricity is obtained through the output leads 35.

With such a cell, a current density of 120 ma./cm.$^2$ has been obtained at a potential of 0.3 v., and at 0.5 v. the current density was 93 ma./cm.$^2$, and the open circuit voltage was 1.5 v. Cells of this type have been run at practically short circuit conditions for as long as 29 days with very little deterioration in current density.

By utilizing Teflon treated palladium-black paste on a platinum screen as the hydrogen electrode 20 (in place of palladium foil), somewhat higher current densities have been obtained, but the life of such modified cells is shorter.

Figure 2:
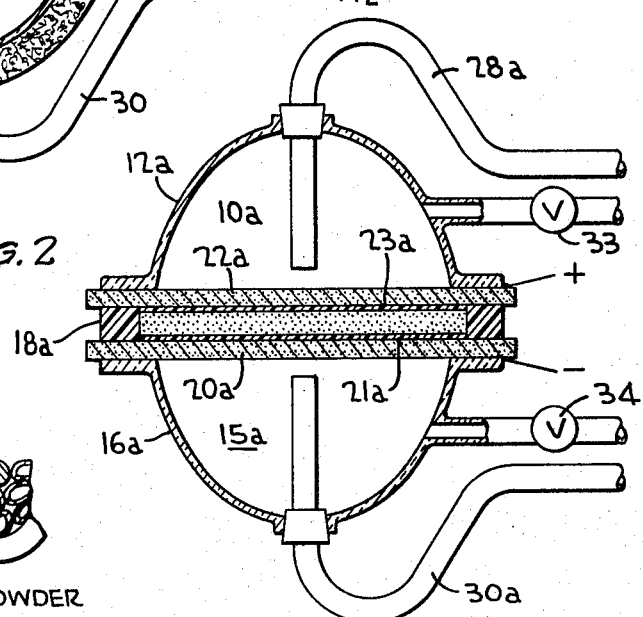
FIGURE 2 is a similar view of a modified cell construction.

FIGURE 2 shows a modified form of cell in accordance with the invention, wherein the porous carbon electrodes are used. In order to simplify the illustration, the surrounding insulation has been omitted, although it should be understood that in many applications such insulation may be used with this configuration also, since retained waste heat from the reaction can then maintain operating temperature.

The modified form of cell includes an oxidizer chamber 10a formed by a shell 12a, and a fuel chamber 15a formed by shell 16a. Between these shells are clamped the Teflon treated porous carbon blocks 20a and 22a, separated at the outside by a Teflon ring or seal 18a.

The fuel electrode 20a is provided with a paste on its surface, indicated at 21a, which is formed of a Teflon dispersion palladium black mixture. Similarly, the oxidizer electrode 22a is provided on one face with a paste of Teflon dispersion-platinum black, indicated at 23a. Between these coated surfaces of the electrodes is formed the electrolyte chamber containing acid electrolyte, which may be for example the previously mentioned 86 percent phosphoric acid mixed into a paste with fine silica.

In such a cell it is possible to operate with air instead of oxygen, and therefore the air may be supplied to chamber 10a through the oxidant supply line 28a, while fuel is supplied through the fuel line 30a. It is also possible to use formic acid as the fuel, in which case the acid decomposes at the electrode surface to form hydrogen.

Such a cell, using air and hydrogen gases as the oxidizer and fuel, has been operated at a temperature of 125° C. for as long as four months, maintaining an essentially constant density of about 91 ma./cm.$^2$ at a potential of approximately 0.27 volt.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. A fuel cell comprising a fuel electrode, an oxidizing electrode, and an electrolyte normally solid at room temperature separating said electrodes, said electrolyte comprising an eutectic mixture including potassium hydroxide and sodium hydroxide, said electrolyte being substantially free of water and having a melting point of about 200° C.

2. A fuel cell comprising a fuel electrode, an oxidizing electrode, and an electrolyte normally solid at room temperature in contact with each of said electrodes, said electrolyte comprising an eutectic mixture of at least two alkali metal hydroxides substantially free from water, said electrolyte having a melting point not greater than about 300° C.

3. The method of operating a fuel cell including fuel and oxidizing electrodes of the gaseous diffusion type, which method comprises the steps of maintaining said electrodes spaced apart in an electrolyte bath having contact with a surface of each electrode, said electrolyte comprising an eutectic mixture of at least two alkali metal hydroxides substantially free from water, introducing an oxidizing gas which is a source of free oxygen and a hydrogen containing fuel gas into the cell and into contact with the corresponding electrodes and maintaining the cell at a temperature at least equal to the melting point of said mixture and not greater than about 300° C.

4. An electrochemical cell for the direct generation of electrical energy comprising an anode, a cathode, and an electrolyte, said electrochemical cell being constructed and arranged to provide a space between said anode and cathode and said space containing said electrolyte, at least one of said anode and cathode being a non-consumable, gas-consuming electrode comprising a catalytic layer containing a substantially uniform admixture of metal containing electrocatalyst particles and a fluorocarbon polymer, said catalytic layer being exposed to the electrolyte of the cell and having a porosity sufficient to permit diffusion of gases into said catalytic layer.

5. The electrochemical cell of claim 4 wherein the electrode includes a porous substrate and said catalytic layer is deposited upon said porous substrate.

6. The electrochemical cell of claim 4 wherein the electrolyte is retained in a hydrophilic matrix.

7. The electrochemical cell of claim 4 wherein the fluorocarbon polymer is polytetrafluoroethylene.

8. The electrochemical cell of claim 7 wherein the electrocatalyst comprises silver.

9. The electrochemical cell of claim 7 wherein the electrocatalyst comprises palladium.

10. The electrochemical cell of claim 7 wherein the electrocatalyst comprises platinum.

11. The electrochemical cell of claim 7 wherein the electrode includes a porous substrate and said catalytic layer is deposited upon said porous substrate.

12. The electrochemical cell of claim 11 wherein the porous substrate is porous carbon.

13. The electrochemical cell of claim 11 wherein the porous substrate is a metal screen.

14. The electrochemical cell of claim 7 wherein the electrolyte is an alkali hydroxide.

15. The electrochemical cell of claim 7 wherein the electrolyte is retained in a hydrophilic matrix.

16. The electrochemical cell of claim 15 wherein the electrolyte is an alkali hydroxide.

References Cited

UNITED STATES PATENTS

| | | | |
|---|---|---|---|
| 409,366 | 8/1889 | Mond et al. | 136—86 |
| 1,588,608 | 6/1926 | Oppenheim | 136—86 |
| 1,634,850 | 7/1927 | Powers | 136—158 |
| 2,275,281 | 3/1942 | Berl | 136—86 |
| 2,384,463 | 9/1945 | Gunn et al. | 136—86 |
| 2,691,814 | 10/1954 | Tait. | |
| 2,730,597 | 11/1956 | Podolsky et al. | |
| 2,813,041 | 11/1957 | Mitchell et al. | |
| 2,828,351 | 3/1958 | Rade | 264—104 X |
| 2,859,268 | 11/1958 | Fishbach et al. | 136—31 X |
| 2,913,511 | 11/1959 | Grubb | 136—86 |
| 2,942,050 | 6/1960 | Denes | 136—120 X |
| 2,951,106 | 8/1960 | Ruetschi | 136—6 |
| 2,980,749 | 4/1961 | Bivers | 136—86 |
| 3,005,943 | 10/1961 | Jaffe | 136—86 X |
| 2,479,451 | 8/1949 | Young | 252—428 |
| 2,901,524 | 8/1959 | Gorin et al. | 136—86 |

FOREIGN PATENTS 806,592   12/1958   Great Britain.

ALLEN B. CURTIS, *Primary Examiner.*

U.S. Cl. X.R.

136—120, 121, 154; 252—430; 260—92